Figure 1:
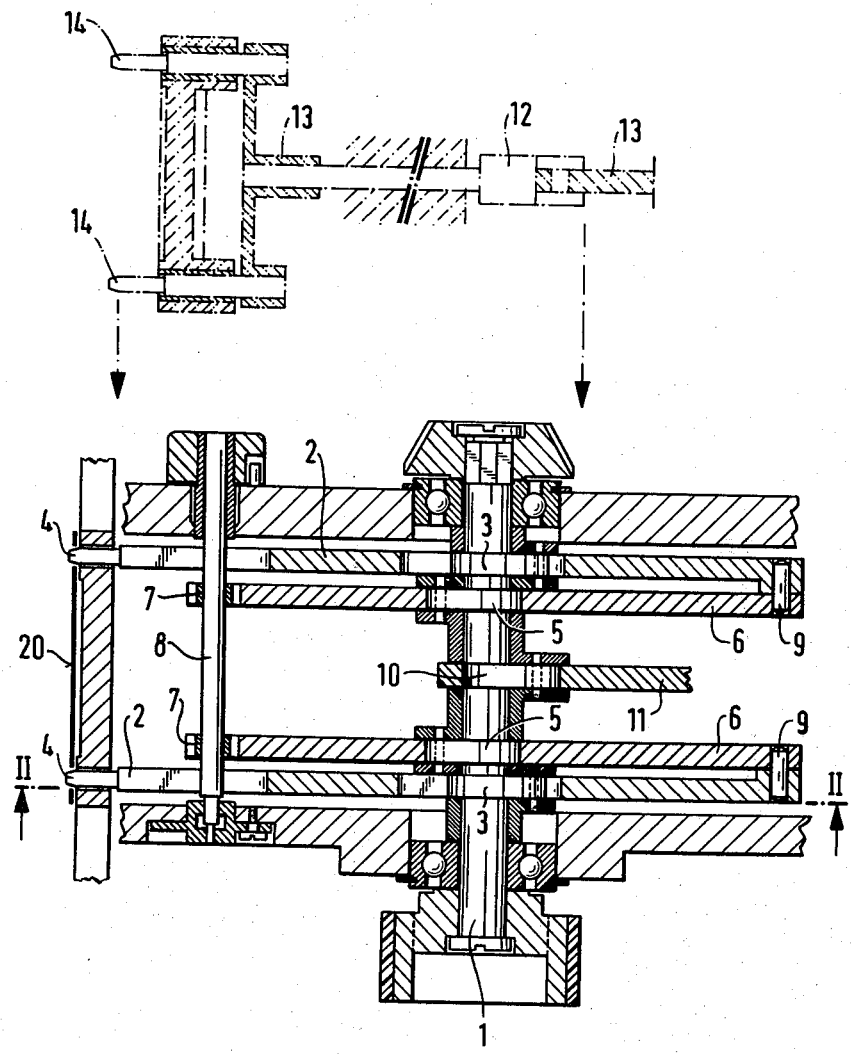

United States Patent [19]

Blaschek

[11] 4,405,070
[45] Sep. 20, 1983

[54] FILM TRANSPORT MECHANISM
[75] Inventor: Otto Blaschek, Aschheim, Fed. Rep. of Germany
[73] Assignee: Arnold & Richter Cinetechnik GmbH, & Co. Betriebs KG, Munich, Fed. Rep. of Germany
[21] Appl. No.: 237,658
[22] Filed: Feb. 24, 1981
[30] Foreign Application Priority Data
Feb. 26, 1980 [DE] Fed. Rep. of Germany ... 8005124[U]
Jan. 21, 1981 [DE] Fed. Rep. of Germany ....... 3101813
[51] Int. Cl.³ .......................... G03B 1/28; G03B 1/22
[52] U.S. Cl. ......................................... 226/55; 226/68
[58] Field of Search .................................. 226/55–58, 226/62, 67, 68–73

[56] References Cited
U.S. PATENT DOCUMENTS
2,760,403 8/1956 Wall ....................................... 226/57
3,618,837 11/1971 Jacobsen ............................... 226/57
3,777,961 12/1973 Blaschek .............................. 226/57

FOREIGN PATENT DOCUMENTS
1280667 6/1969 Fed. Rep. of Germany.

Primary Examiner—Leonard D. Christian
Attorney, Agent, or Firm—Fleit, Jacobson & Cohn

[57] ABSTRACT

In the film transport mechanism, the film strip is driven in the perforation plane from a drive shaft by means of at least one transport pin. The drive shaft has in the perforation plane a constant-diameter cam, to which the transport pin is coupled by a shuttle frame. To improve such film transport mechanism so as to reduce the noise generated by it in operation, the shuttle frame is additionally coupled to a rocking crank and slider linkage or to a slider, which is part of a slider crank mechanism, which has a drive shaft that is identical to the shaft for driving the transport shuttle.

8 Claims, 4 Drawing Figures

FILM TRANSPORT MECHANISM

This invention relates to a film transport mechanism in which the film strip is driven in the perforation plane from a drive shaft by means of at least one transport pin and the drive shaft has in the perforation plane a constant-diameter cam to which the transport pin is coupled by a shuttle frame.

In such film transport mechanism, which is known from German Patent Specification No. 1,280,667, the motion of the shuttle frame is controlled by two pairs of constant-diameter cams, which are provided on two different shafts, which are coupled with a ratio of 1:1. The bearings for the directly driven shaft and the coupling itself are sources of undesired noise. Besides, the transport pins cannot be re-adjusted relative to the perforation holes in the film strip.

It is an object of the invention to provide a film transport mechanism which is of the kind described first hereinbefore and produces less noise.

This object is accomplished according to the invention in that the shuttle frame is additionally coupled to a rocking crank and slider linkage.

Owing to the provision of a rocking crank and slider linkage, the transport mechanism requires only one drive shaft and as a result produces less noise.

According to a preferred further feature, the rocker of the rocking crank and slider linkage is slidably guided on a supporting pivot, which is displaceable in the plane of the rocker to permit the transport pin to be adjusted relative to the perforation holes of the film strip. This permits a change of the depth of penetration as well as the locations at which the engagement begins and ends.

The object can also be accomplished in that the shuttle frame is additionally coupled to a crank and rocker linkage. According to a preferred further feature of that concept the fixed pivot of the rocker is displaceable in the plane of the rocker for an adjustment of the transport pin relative to the perforation plane of the film strip.

To permit a control of the registration pin or pins, said pin is or said pins are carried by a slider, which is part of a slider crank mechanism, which has a drive shaft that is identical to the shaft for driving transport shuttle.

According to a further preferred feature of the invention, the constant-diameter cams are circular or approximately circular. This will permit a further noise reduction and a simple manufacture of the cams.

Figure 2:
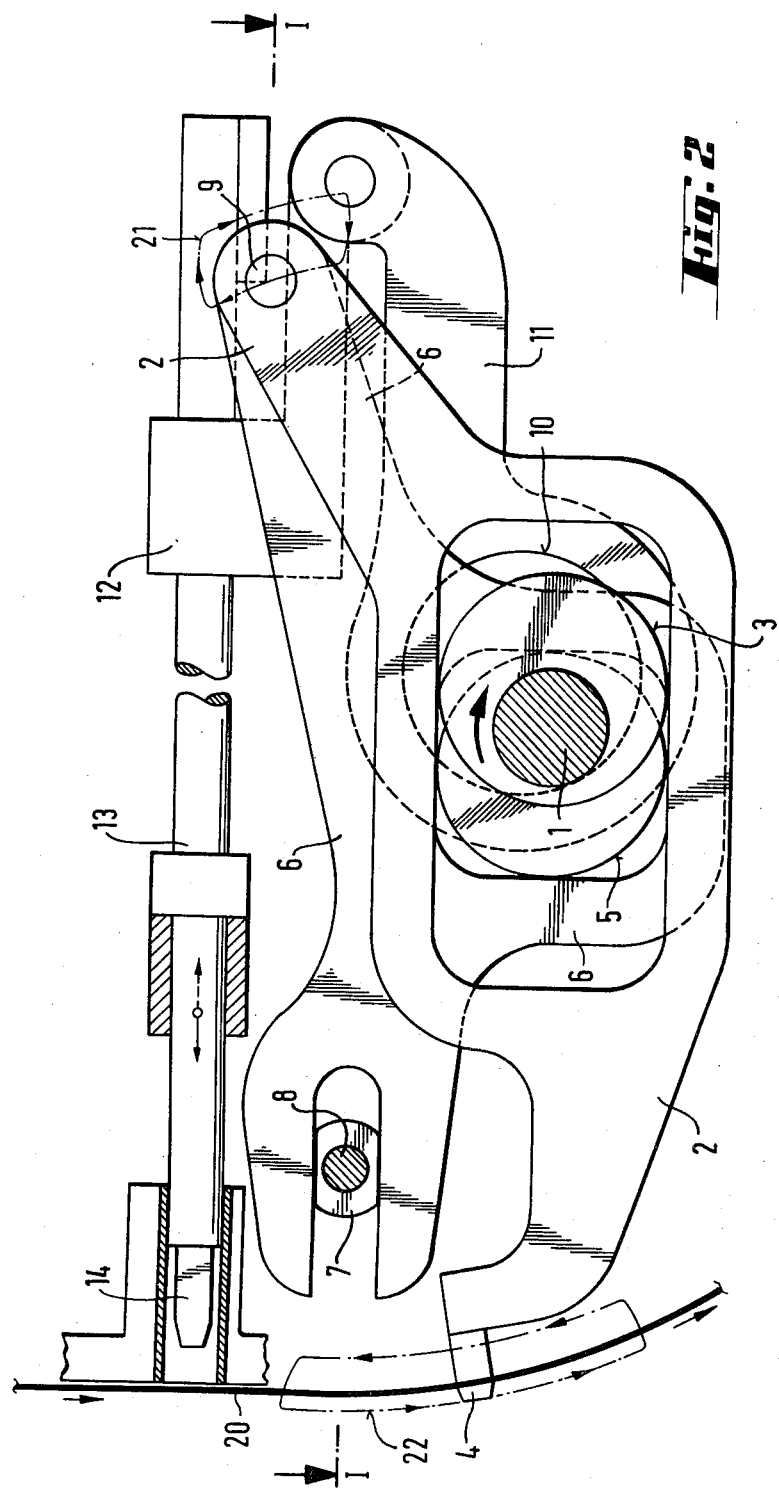

Two illustrative embodiments of the invention will now be explained with reference to the drawings, in which FIG. 1 is a side elevation of a first portion of one embodiment of a film transport mechanism according to the present invention;

FIG. 1a is a side elevation of a second portion of the embodiment of FIG. 1;

FIG. 2 a top plan view showing the film transport mechanism of FIG. 1 and

Figure 3:
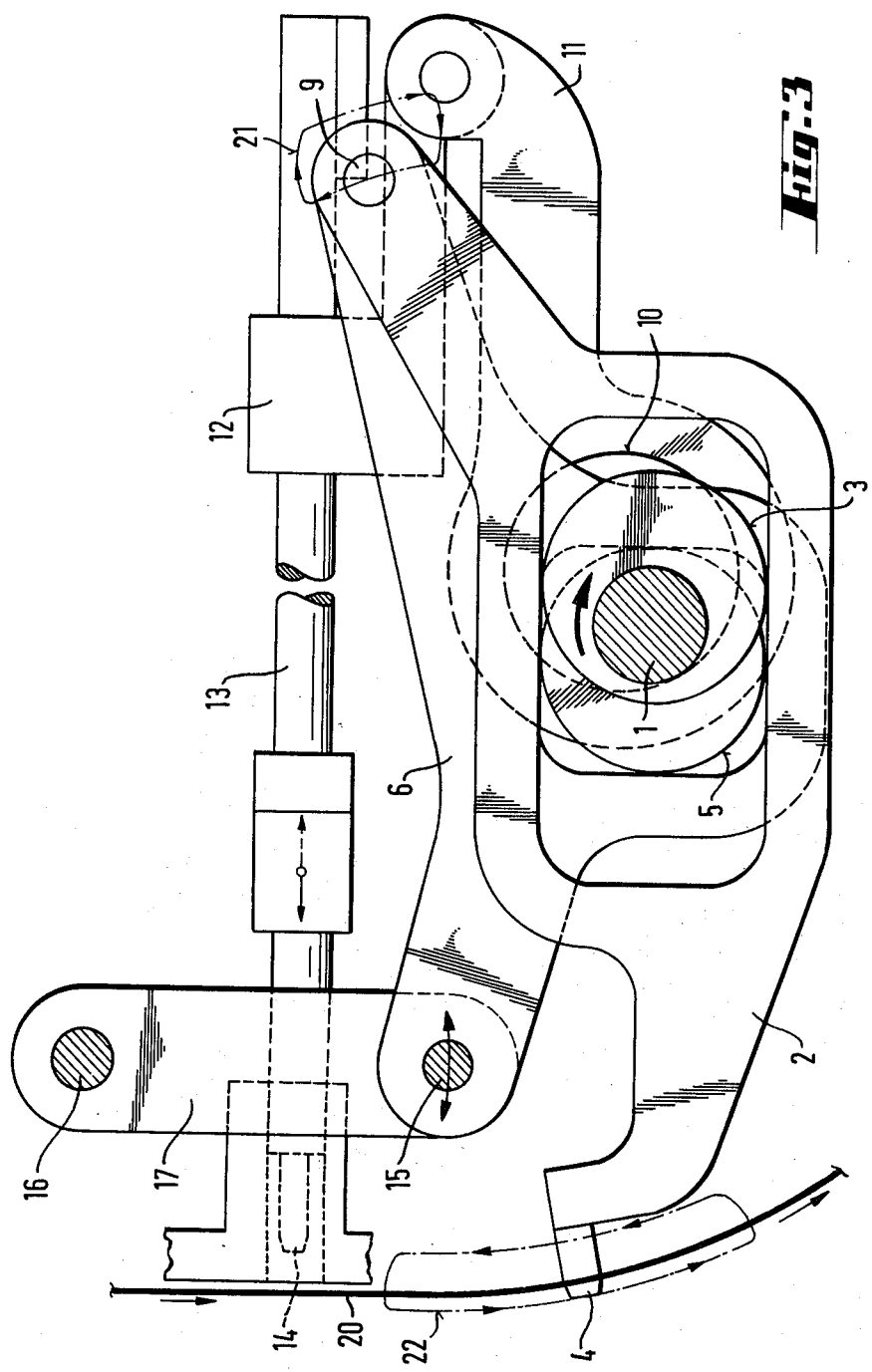

FIG. 3 is a top plan view showing another embodiment of the film transport mechanism.

A drive shaft 1 carries two constant-diameter cams 3. The longitudinal direction of the drive shaft 1 is parallel to the film plane and the drive shaft itself is at right angles to the direction of travel of the film 20. The two constant-diameter cams 3 are disposed in the two perforation planes of the film. Two shuttle frames 2 are connected to respective ones of the constant-diameter cams and comprise at least one film transport pin 4 each for transporting the film, as represented by the arrows 22 in FIG. 2. The film is transported as a result of the rotation of the constant-diameter cams 3.

Two control cams 5 are carried by the drive shaft 1 and consist of constant-diameter cams which are designed for optimum oscillatory motions like the constant-diameter cams 3. The rockers 6 are rotatably mounted on respective ones of the control cams. At its end facing the film strip each of said rockers 6 is guided by a slider 7 supported by a pivot 8. At its other end, each rocker 6 is connected to one of the shuttle frames 2 at the pivots 9. The control cams 5, the rockers 6 and the supporting pivots constitute rocking crank and slider linkages in which the supporting pivots 8 need not be disposed between the film plane and the control cams.

For an adjustment of the transport pins relative to the perforation holes of the film strip, the supporting pivots 8 are displaceable in the plane of the rocker 6. During the rotation of the drive shaft 1, the pivots 9 describe compound curves 21 caused by the rotation of the control cams 5. The pulling and lifting motion and the motion of the pivots 9 are performed in opposite directions so that the forces due to inertia will be reduced.

In the embodiment shown in FIG. 3, the supporting pivots 8 are replaced by swivel joints having pivots 15, which are pivotally movable around stationary pivots 16, which are used to adjust the stroke position of the shuttle. The connecting rod 6 is pivoted to rockers 17. In this embodiment the shuttle frames are connected to crank and rocker linkages consisting of the drive shaft 1, the control cams 5, the connecting rods 6 and the rockers 17 rather than to rocking crank and slider linkages.

As is apparent from FIG. 1, the drive shaft is also provided with a cam 10, on which a connecting rod 11 is rotatably mounted. A connecting link 12 is pivoted to the end of the connecting rod 11 and is rigid with a slider 13. The slider is mounted to be horizontally movable and carries the registration pins 14. The cam 10, the connecting rod 11 and the slider 13 constitute a slider crank linkage which causes the registration pins to reciprocate.

in the embodiments described by way of example, one transport pin and one registration pin are disposed in each perforation plane. But an adequate film transport will also be ensured if a film transport pin and a registration pin are provided only in one perforation plane. In that case, each of the actuating elements is required only once.

What is claimed is:

1. A film transport mechanism comprising:
   a drive shaft;
   cam control means mounted for rotation with said drive shaft; and
   a shuttle frame pivotally and longitudinally movable by said cam control means, said shuttle frame having a transport pin engageable with a film perforation for advancing the film when said shuttle frame is moved by said cam control means;
   said cam control means comprising:
   a first constant-diameter cam wheel mounted on said drive shaft and directly engaged with said shuttle frame;
   a second constant-diameter cam wheel mounted on said drive shaft;

a rocker engaged and moved by said second cam wheel, said rocker having a first end portion pivotally engaged with said shuttle frame and a second end portion; and means for guiding movement of said second end portion of said rocker.

2. A film transport mechanism according to claim 1, wherein said means for guiding movement of said second end portion of said rocker comprises a slider engaged by said second end portion, and a pivot connected to a frame of the film transport mechanism, the slider and pivot cooperating with each other to guide pivotal movement and displacement of said second end portion.

3. A film transport mechanism according to claim 2, wherein said rocker, said second cam wheel, said pivot, and the pivot connection between said rocker and said shuttle frame form a rocking crank and slider linkage cooperating with said first cam wheel for controlling movement of said shuttle frame.

4. A film transport mechanism according to claim 1, wherein the film has laterally spaced apart rows of perforations and wherein a shuttle frame and cam control means are provided for each row of perforations.

5. A film transport mechanism according to claim 2, wherein said slider and pivot are slidable for adjusting the position of the transport pin with respect to the film perforation to be engaged and are fixable in positions determined by the spacing between adjacent film perforations.

6. A film transport mechanism according to claim 1, wherein said first cam wheel is positioned to pivotally move said shuttle frame in one direction and said second cam wheel is positioned to pivotally move said rocker in an opposite direction.

7. A film transport system according to any one of claims 1 to 6, characterized in that the cam wheels are circular or approximately circular.

8. A film transport mechanism according to claim 1, further comprising:

a slider crank linkage rotatably driven by said drive shaft; and a film perforation registration pin reciprocated by said slider crank linkage.

* * * * *